United States Patent [19]

Opitz et al.

[11] Patent Number: 5,138,947
[45] Date of Patent: Aug. 18, 1992

[54] FLYING BODY INCLUDING A TARGET DETECTION DEVICE

[75] Inventors: Hans-Peter Opitz, Ratingen; Joachim Paech, Erkrath; Uwe Aulenbacher, Celle, all of Fed. Rep. of Germany

[73] Assignees: Rheinmetall GmbH, Düsseldorf, Fed. Rep. of Germany; TZN Forschungs-und Entwicklungszentrum Unterluss GmbH, Unterluss, Fed. Rep. of Germany

[21] Appl. No.: 704,371

[22] Filed: May 23, 1991

[30] Foreign Application Priority Data

May 30, 1990 [DE] Fed. Rep. of Germany ....... 4017353

[51] Int. Cl.[5] ................................................ F42C 13/02
[52] U.S. Cl. .................................... 102/213; 102/384
[58] Field of Search ............................... 102/213, 384

[56] References Cited

U.S. PATENT DOCUMENTS

| | | | |
|---|---|---|---|
| 3,818,833 | 6/1974 | Throner, Jr. ............. | 102/384 |
| 4,398,466 | 8/1983 | Sepp et al. ............. | 102/427 |
| 4,587,902 | 5/1986 | Lindner et al. .......... | 102/213 |
| 4,770,482 | 9/1988 | Sweeney et al. ......... | 244/3.16 |
| 4,805,532 | 2/1989 | Synofzik et al. ......... | 102/213 |

FOREIGN PATENT DOCUMENTS 3428051 3/1986 Fed. Rep. of Germany ...... 102/213

*Primary Examiner*—Charles T. Jordan
*Attorney, Agent, or Firm*—Spencer, Frank & Schneider

[57] ABSTRACT

A flying body is provided with target detection capability. The flying body has an exterior wall and a target detection device for scanning a target area disposed within the body. The target detection device includes a combined laser transmitting/receiving system, having a laser and a laser radiation detector, stationarily mounted within the flying body. A holder is displaceably mounted for movement between a first position within the body and a second position where the holder extends outside of the exterior wall of the body. A first deflection mirror is disposed on the holder for reflecting radiation coming from the target area onto the laser radiation detector when the holder is in the second position. Additionally, a second deflection mirror is disposed on the holder for deflecting radiation coming from the laser toward the target area when the holder is in the second position.

8 Claims, 4 Drawing Sheets

FLYING BODY INCLUDING A TARGET DETECTION DEVICE

BACKGROUND OF THE INVENTION

The present invention relates to a flying body including a target detection device for scanning a target area, wherein a first deflection mirror is disposed on a holder that can be moved outside of the flying body to reflect radiation coming from the target area onto the target detection device.

Such a flying body is disclosed, for example, in German Patent No. 3,326,876 and in corresponding U.S. Pat. No. 4,587,902. These documents relate to a submunition body in which an infrared target detection device, which accommodates an optical system as well as a sensor system, is disposed on an extendable holder. This configuration has the drawback that electrical components, for example sensors as well as the possibly required thermal cooler and their connections, must be displaced. The entire holder including the optical and sensor system has a relatively voluminous structure. Moreover, it is only possible to detect targets which emit IR radiation. So-called cold targets cannot be detected.

German Patent No. 3,428,051.A1 discloses a submunition body which includes a millimeter wave sensor having an unfoldable antenna. This publication does not teach how the disclosed system could be used for IR target detection devices, particularly for active detectors. The main drawback of such a target detection device is that it is generally not possible to obtain an accurate spatial resolution of the target.

SUMMARY OF THE INVENTION

It is therefore an object of the present invention to provide a flying body including a target detection device of the above-mentioned type in which the optical system has a flat configuration and in which electrical components, including sensors, and their terminals as well as any possibly required cooler need not be displaced when the holder is extended. Moreover, it is a further object to provide good spatial resolution of the target.

The above and other objects are accomplished according to the invention by the provision of a flying body with target detection capability, comprising: a body having an exterior wall; and target detection means for scanning a target area disposed within said body and including: a combined laser transmitting/receiving system, including laser means for producing laser radiation output and a laser radiation detector, stationarily mounted within the flying body; a holder displaceably mounted for movement between a first position within the body and a second position where the holder extends outside of the exterior wall of the body; a first deflection mirror disposed on the holder for reflecting radiation coming from the target area onto the laser radiation detector when the holder is in the second position; and a second deflection mirror disposed on the holder for deflecting radiation coming from the laser toward the target area when the holder is in the second position.

The present invention is thus based on the idea of separating the detectors from the actual optical system in modular form. Only the optical system composed of deflection mirrors is disposed on the holder and is moved out of the flying body (projectile).

By employing a combined laser transmitting/receiving system it is possible to very accurately scan the target area. Preferably, the distance between the flying body and the target area is measured and a distance or height profile is compiled and compared with values measured earlier in time. The extracted information is then compared with stored signals.

Further details and advantages of the invention will be described in greater detail below with reference to an embodiment thereof illustrated in the accompanying drawing figures.

BRIEF DESCRIPTION OF THE DRAWINGS

FIG. 2 is a longitudinal sectional view which shows the submunition body according to the invention as shown in FIG. 1, with the deflection mirrors folded in.

DETAILED DESCRIPTION OF PREFERRED EMBODIMENTS

Figure 1:
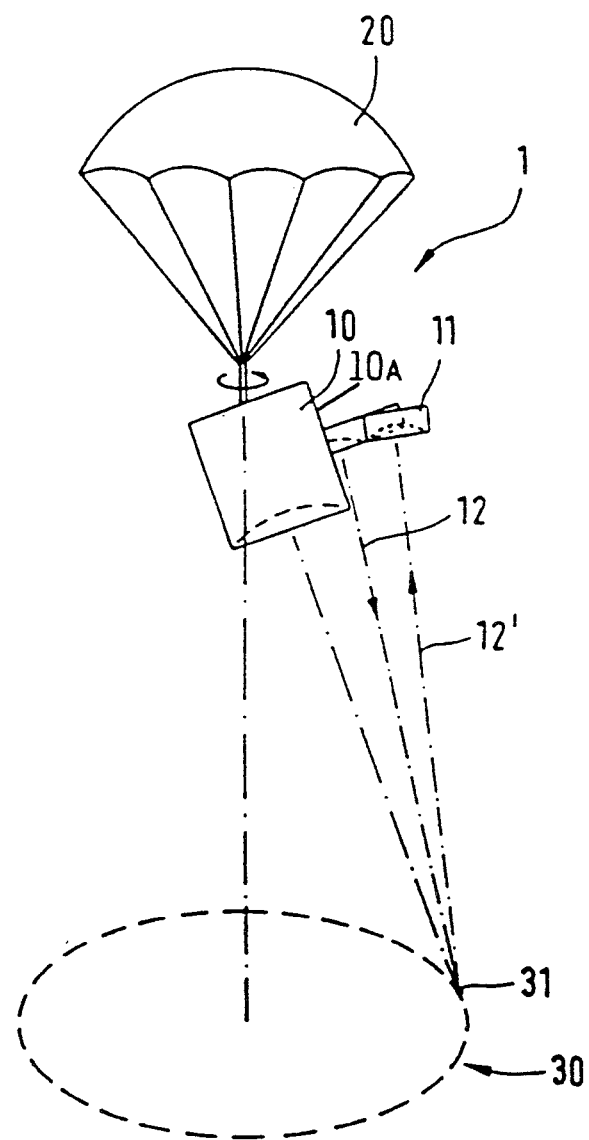
FIG. 1 is a schematic representation of a submunition body with extended antenna during scanning of the target area according to the invention.

Referring to FIG. 1, there is shown a submunition body 1 which, in the present case, is suspended from a parachute 20 and rotates. Submunition body 1 includes a projectile or flying body 10 having an exterior wall 10a. A holding device 11 to which deflection mirrors (not marked individually in FIG. 1) are fastened is shown extending from wall 10a. Infrared (IR) radiation 12 emanating from an IR source within projectile body 10 reaches a target area 30 to be scanned, is reflected there, and the reflected radiation 12' travels via an appropriate deflection mirror provided on holder 11 into the projectile body for further processing. The scanning path of the IR beam 12 is marked 31.

Figure 2:
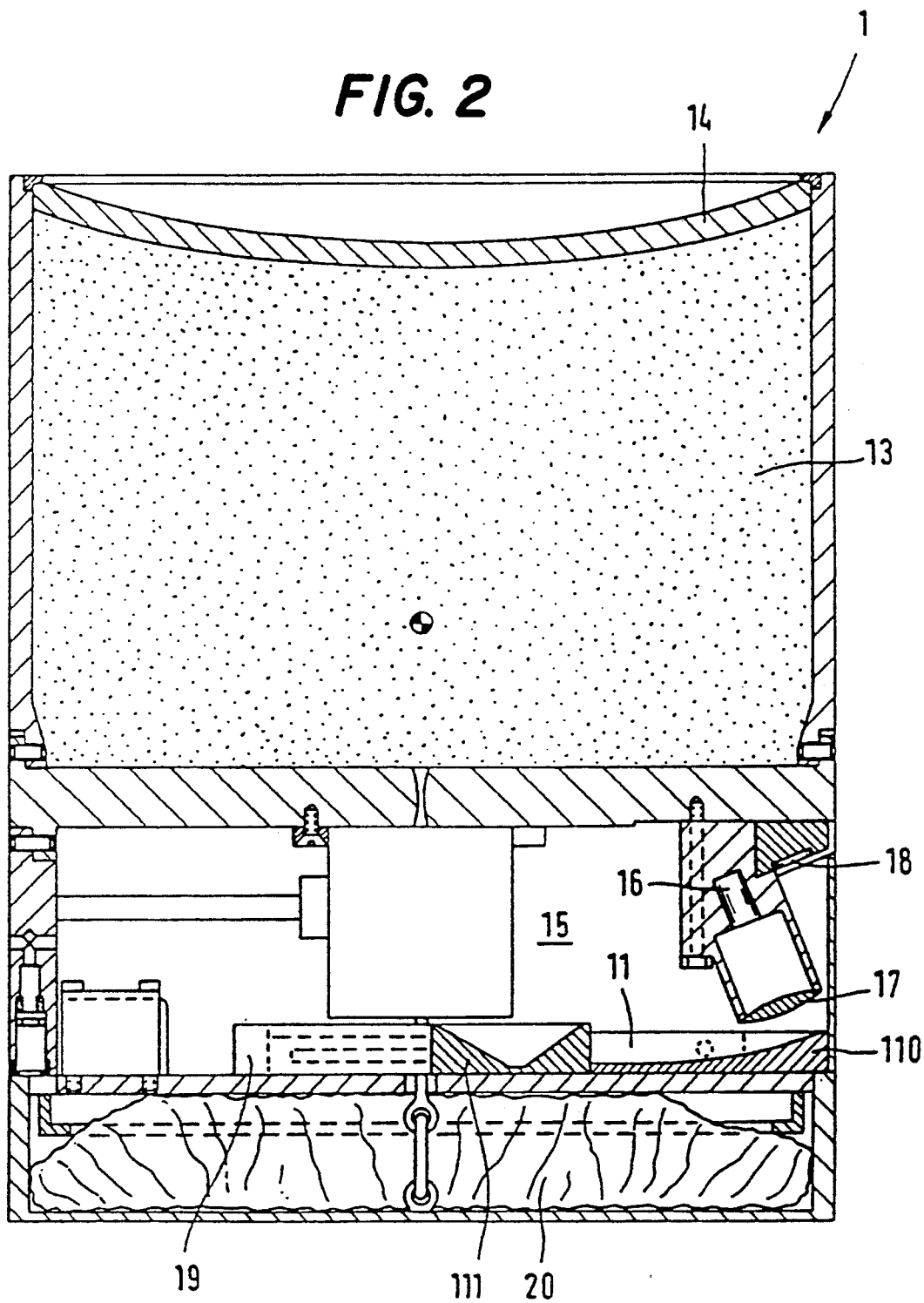

FIG. 2 shows a submunition body 1 according to the invention in which parachute 20 has not yet opened and holder 11 is still disposed in the interior of the projectile body. Essentially, projectile body 10 includes an explosive 13 and a projectile forming liner 14 arranged ahead of explosive 13 when seen in the direction of the target. The rear portion of the projectile body accommodates an electronic system 15 (not shown in detail), as well as a laser 16, a lens system 17 and a laser detector 18. A mirror 110 causing the reflection of the received IR radiation 12' and a mirror 111 deflecting the laser radiation onto the target are disposed on holder 11. Additionally, a pyrotechnic drive 19, which is shown only schematically, is disposed in the interior of projectile body 10 for causing the holder and deflection mirrors 110 and 111 to be pushed out of the projectile at the proper time.

Figure 3:
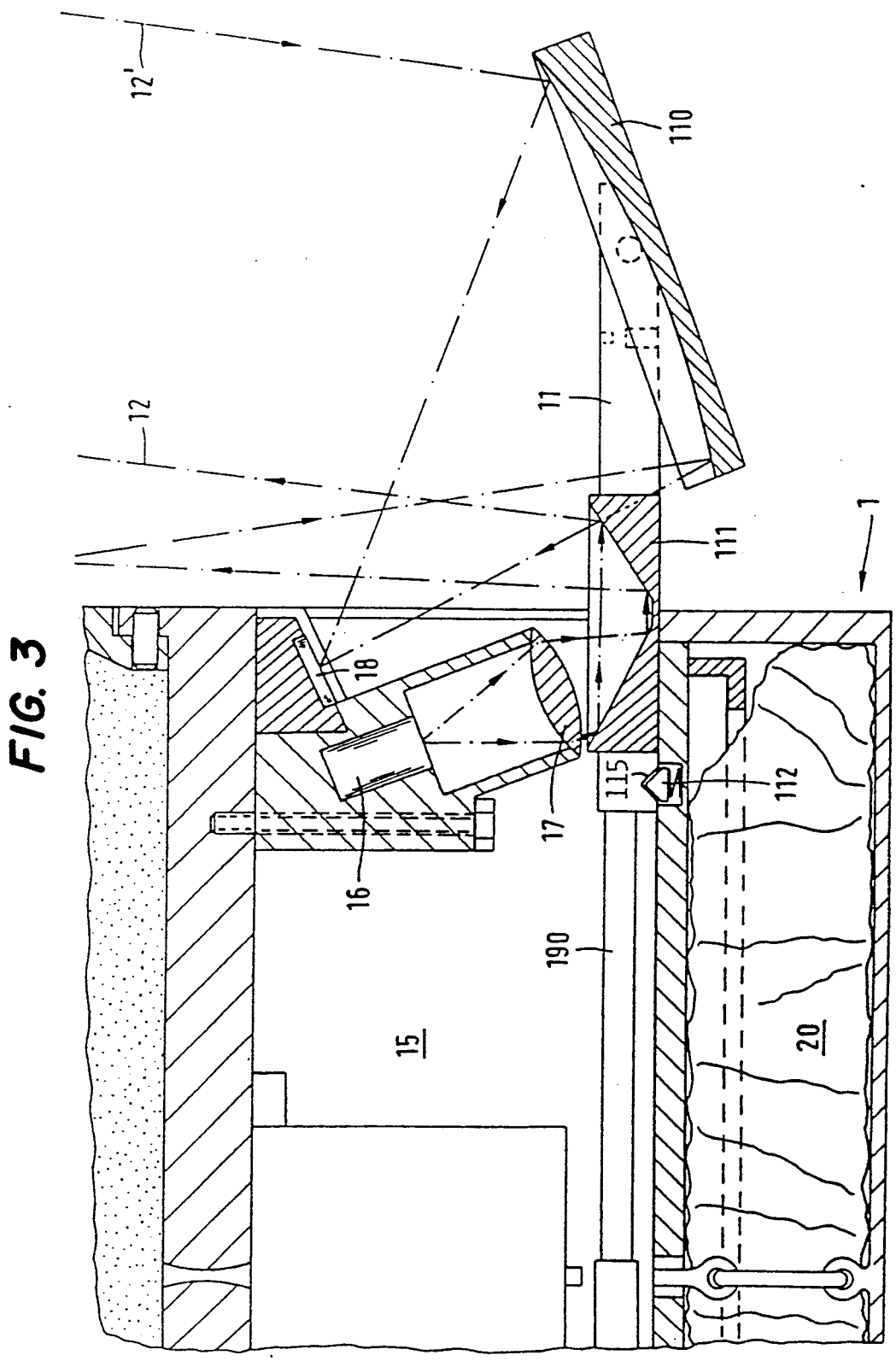
FIG. 3 is a longitudinal sectional view of the submunition body shown in FIG. 2, with the deflection mirrors folded out.
Figure 4:
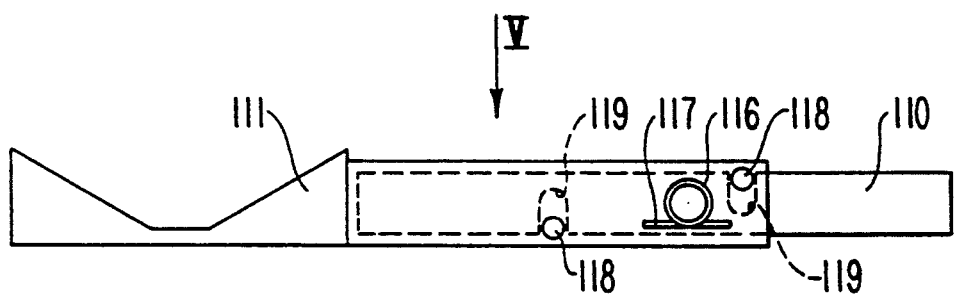
FIG. 4 is a side view of the moving parts of the mirror system in FIG. 3.
Figure 5:
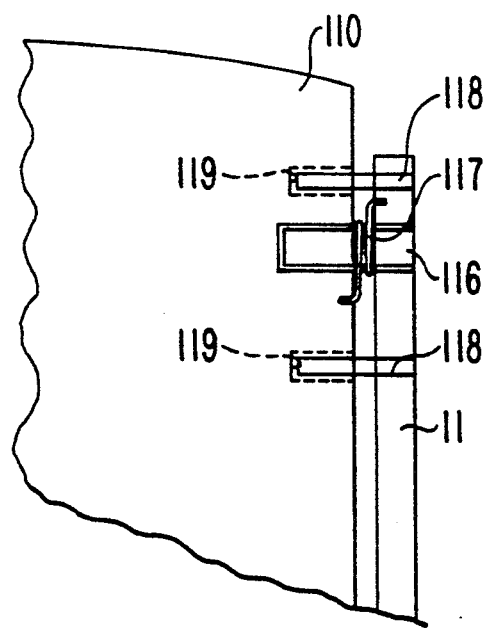
FIG. 5 is a detail of FIG. 4 from a view marked with V.

FIG. 3 shows holder 11 pushed out of the projectile. In the present embodiment, holder 11 is pushed out by means of a plunger 190 which is connected with pyrotechnic drive 19. Of course, other drives are also possible. For example, instead of a pyrotechnic drive, a spring may be employed. In the end position of the holder, a spring tensioned locking pin 112 engages a detent 115 in holder 11 and thus arrests the latter in its extended position. Mirror 110 for the IR radiation 12' to be received is arranged to be rotatable. Rotation of mirror 110 may be effected, for example, with the aid of a cylindrical spring 117 around an axis of rotation 116 (as shown in FIGS. 4 and 5). As soon as mirror 110 has reached its predetermined end position, it is arrested again either by a spring bolt 118 at holder 11 and by a stop 119 provided at mirror 110, such as locking pin 112 as described above.

As shown in FIGS. 2 and 3, laser 16 whose radiation is directed onto mirror 111 by lens system 17 as well as laser detector 18 are firmly and stationarily disposed within projectile body 10.

Preferably, the laser system is composed of semiconductor laser diodes whose characteristic wavelength lies around 1 μm. However, lasers operating in a range of 3 to 5 μm can also be employed. The laser is operated as a pulsed laser. The clock pulse rate is here about 1 to 10 KHz. The pulse output power lies at $\leq 50$ Watt.

The operation of the invention will now be described in greater detail. The rotating laser transmitting/receiving system, operating as a laser distance measuring device, scans the ground at a fixed viewing angle. If the beam passes over a target, a characteristic jump in height is produced which is recorded by the laser distance measuring device.

Successive measuring data produce a typical profile. For high resolution distance measurements the pulse rise time must be 23 1 ns.

For extraction of, for example, a tank height profile from recorded data, an extrapolated estimate from the distance data of the last 10 to 100 measurements is compiled for the next measurement data in the immediate future. The height profile then results from the difference between the actually measured value and the estimated value. The extracted information is compared by means of a correlator with stored signatures or is classified with the aid of global features (such as time duration, intensity, differences in distance). From this result, the tank can be identified, possibly with the aid of further sensors. The operation of laser transmitting 1 receiving systems which operate as distance measuring systems are described in U.S. Pat. Nos. 4,398,466 and 4,770,482.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A flying body with target detection capability, comprising:
   a body having an exterior wall; and
   target detection means for scanning a target area disposed within said body and including:
      a combined laser transmitting/receiving system, including laser means for producing a laser radiation output and a laser radiation detector, stationarily mounted within said body;
      a holder displaceably mounted for movement between a first position within said body and a second position where said holder extends outside of the exterior wall of said body;
      a first deflection mirror disposed on said holder for reflecting radiation coming from the target area onto said laser radiation detector when said holder is in said second position; and
      a second deflection mirror disposed on said holder for deflecting radiation coming from said laser toward the target area when said holder is in said second position.

2. A flying body as defined in claim 1, wherein said first deflection mirror is rotatably mounted on said holder.

3. A flying body as defined in claim 1, wherein said second deflection mirror is closer to the exterior wall of said body than said first deflection mirror when said holder is in said second position.

4. A flying body as defined in claim 1, wherein said laser transmitting/receiving system comprises a distance measuring system for determining a distance profile of the target area.

5. A flying body as defined in claim 4, wherein said laser means produces a pulsed radiation output.

6. A flying body as defined in claim 1, and further comprising displacement means for displacing said holder from said first position to said second position.

7. A flying body as defined in claim 6, wherein said displacement means comprises a pyrotechnic drive.

8. A flying body as defined in claim 6, wherein said displacement means includes an extendable plunger arm connected to said holder and locking means for locking said arm in an extended position which locks said holder in said second position.

* * * * *